(12) United States Patent
Lee et al.

(10) Patent No.: US 8,599,885 B2
(45) Date of Patent: *Dec. 3, 2013

(54) MEDIA PLAYER AND CONTROL METHOD THEREOF

(75) Inventors: Yui-yoon Lee, Suwon-si (KR); Kwang-hoon Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,114

(22) Filed: Mar. 9, 2012

(65) Prior Publication Data

US 2012/0169933 A1 Jul. 5, 2012

Related U.S. Application Data

(63) Continuation of application No. 11/443,182, filed on May 31, 2006, now Pat. No. 8,213,462.

(30) Foreign Application Priority Data

Aug. 11, 2005 (KR) .............................. 2005-0073934

(51) Int. Cl.
*H04J 3/06* (2006.01)

(52) U.S. Cl.
USPC ....................................................... 370/516

(58) Field of Classification Search
None
See application file for complete search history.

(56) References Cited

U.S. PATENT DOCUMENTS

| | | | |
|---|---|---|---|
| 5,805,202 A | 9/1998 | Mullins et al. | |
| 6,438,163 B1 | 8/2002 | Raghavan et al. | |
| 6,753,881 B1 | 6/2004 | Callaway et al. | |
| 7,065,133 B1 | 6/2006 | Phanse et al. | |
| 7,254,198 B1 | 8/2007 | Manickam et al. | |
| 7,664,172 B1 | 2/2010 | Manickam et al. | |
| 2003/0090320 A1 | 5/2003 | Skrobko et al. | |
| 2003/0117960 A1 | 6/2003 | Quinlan et al. | |
| 2004/0027357 A1 | 2/2004 | Mendelson et al. | |
| 2005/0066203 A1 | 3/2005 | Handa et al. | |
| 2005/0079837 A1 | 4/2005 | Koenig | |
| 2007/0242742 A1 | 10/2007 | Biman et al. | |
| 2009/0190027 A1 | 7/2009 | Delia | |

FOREIGN PATENT DOCUMENTS

| | | |
|---|---|---|
| KR | 20020038292 | 5/2002 |
| KR | 1020050012515 | 2/2005 |
| WO | WO 03/079623 | 9/2003 |

OTHER PUBLICATIONS

Shakiba, *A 2.5GB/S Adaptive Cable Equalizer*, in IEEE ISSCC. Dig. Tech. Papers, Feb. 1999, pp. 396-397, 483.
Shakiba, *A 2.5Gb/s Adaptive Cable Equalizer*, ISSCC99/Session23/Paper WP 23.3, 1999 IEEE International Solid-State Circuits Conference, 3 pages.
Edison et al., *HDMI: High-Definition Multimedia Interface*, SID International Symposium Digest of Technical Papers, May 2003, vol. 34 No. 2, pp. 1024-1027.

*Primary Examiner* — Gregory Sefcheck
*Assistant Examiner* — Amar Persaud
(74) *Attorney, Agent, or Firm* — Roylance, Abrams, Berdo & Goodman, L.L.P.

(57) ABSTRACT

Provided is a media player comprising a connector to which a cable for transmitting a media signal from an external source is connected, and a user manipulator, the media player including a signal processor for processing the media signal transmitted through the cable; a UI generator for generating a setting menu for setting characteristics of the cable; and a controller for controlling the signal processor to process the media signal on the basis of the set characteristics of the cable inputted through the setting menu by the user manipulator. The media player and a control method thereof provides a user interface (UI) allowing a user to input information about cable characteristics, and process a signal according to the cable characteristics inputted by a user.

17 Claims, 5 Drawing Sheets

MEDIA PLAYER AND CONTROL METHOD THEREOF

CROSS-REFERENCE TO RELATED APPLICATION

This application is a continuation of U.S. patent application Ser. No. 11/443,182, filed on May 31, 2006, which claims the benefit under 35 U.S.C. §119(a) of Korean Patent Application No. 2005-0073934, filed in the Korean Intellectual Property Office on Aug. 11, 2005, the entire disclosures of both of said prior applications being hereby incorporated by reference.

BACKGROUND OF THE INVENTION

1. Field of the Invention

The present invention relates to a media player and a control method thereof. More particularly, the present invention relates to a media player and a control method thereof, which receives and processes a signal from an external source.

2. Description of the Related Art

A display apparatus, which displays an image based on a received video signal, generally employs a cable connected thereto to receive the video signal from a signal source. The cable is one of various cable designs, wherein each cable design is designed according to the type of a transmission signal it is going to carry and a desired length. For example, a conventional high definition multimedia interface (HDMI) cable having a length of 7 m or more has noise that is generated by virtue of its design characteristics. An exemplary design characteristic is a star cable design.

A display apparatus processes a signal transmitted through the connected cable, thereby displaying an image. The signal processing operation is performed to compensate for frequency loss such as signal loss or signal weakening that results due to the connected cable. The conventional display apparatus processes the received signal on the basis of a register value used for frequency loss compensation.

The register value is set by a manufacturer while the display apparatus is being produced. The manufacturer sets the register value to an optimal value associated with a reference connected cable. That is, the manufacturer tests various cables for noise and then sets the optimal register value at which a resulting image has the least amount of noise.

However, in the case where a user uses a cable having different characteristics than the reference cable, frequency loss may be generated. For example, in the case where a user uses the cable having a length longer or shorter than 7 m by a predetermined length, under the condition that the register value is set with regard to the connection cable having a length of 7 m, noise is likely to arise in processing the signal.

Accordingly, there is a need for an improved media player that can process a signal with a minimized amount of noise despite the characteristics of a cable.

SUMMARY OF THE INVENTION

Exemplary embodiments of the present invention address at least the above problems and/or disadvantages and provide at least the advantages described below. Accordingly, an aspect of the present invention is to provide a media player and a control method thereof, which can provide a user interface (UI) allowing a user to input information about cable characteristics, and process a signal according to the cable characteristics inputted by a user.

Additional aspects and/or advantages of exemplary embodiments of the present invention will be set forth in part in the description which follows and, in part, will be obvious from the description, or may be learned by practice of the exemplary embodiments of the present invention.

The foregoing and/or other aspects of exemplary embodiments of the present invention can achieved by providing a media player comprising a connector to which a cable for transmitting a media signal from an external source is connected, and a user manipulator, the media player comprising a signal processor for processing the media signal transmitted through the cable; a UI generator for generating a setting menu for setting characteristics of the cable; and a controller for controlling the signal processor to process the media signal on the basis of the set characteristics of the cable inputted through the setting menu by the user manipulator.

According to another exemplary embodiment of the present invention, the setting menu for setting characteristics of the cable comprises inputting information about the characteristics of the cable, the information comprising at least one of an item of the length of the cable and an item for selecting sensitivity based on the characteristics of the cable.

According to another exemplary embodiment of the present invention, the signal processor comprises an equalization circuit for compensating for frequency loss of the media signal.

According to another exemplary embodiment of the present invention, the media player further comprises a register for compensating the frequency loss of the media signal, wherein the controller determines a register value depending on the inputted information about the characteristics of the cable, and controls the equalization circuit to process the media signal on the basis of the register value.

According to another exemplary embodiment of the present invention, the controller comprises at least one of a CPU and a microcomputer.

According to another exemplary embodiment of the present invention, the connector comprises at least one of an HDMI connector and a DVI connector.

According to another exemplary embodiment of the present invention, the signal processor comprises a TMDS receiver.

The foregoing and/or other aspects of exemplary embodiments of the present invention can achieved by providing a media player comprising a connector to which a cable for transmitting a media signal from an external source is connected, and a user manipulator, the media player comprising a signal processor for compensating for frequency loss of the media signal; a UI generator for generating a menu for inputting information about characteristics of the cable; and a controller for determining a setting value used for the compensation of the frequency loss on the basis of the information about the characteristics of the cable inputted using the menu through the user manipulator, and for controlling the signal processor to process the frequency loss of the media signal on the basis of the determined setting value.

According to another exemplary embodiment of the present invention, the information about the characteristics of the cable includes information about the length of the cable.

According to another exemplary embodiment of the present invention, the connector comprises at least one of an HDMI connector and a DVI connector, and the signal processor comprises a TMDS receiver.

The foregoing and/or other aspects of an exemplary embodiment of the present invention can achieved by providing a media player comprising a connector to which a cable for transmitting a media signal from an external source is connected, and a user manipulator, the media player comprising a signal processor for compensating for frequency loss of the media signal; a UI generator for generating a menu for adjusting a for the compensation of the frequency loss according to characteristics of the cable; and a controller for controlling the signal processor to compensate for the frequency loss of the media signal on the basis of the gain value selected through the menu.

According to another exemplary embodiment of the present invention, the menu comprises an item for selecting a sensitivity of the compensation for the frequency loss.

According to another exemplary embodiment of the present invention, the connector comprises at least one of an HDMI connector and a DVI connector, and the signal processor comprises a TMDS receiver.

The foregoing and/or other aspects of an exemplary embodiment of the present invention can achieved by providing a method of controlling a media player comprising a connector to which a cable for transmitting a media signal from an external source is connected, and a signal processor to process the media signal transmitted through the cable, the method comprising generating a setting menu for inputting information about characteristics of the cable by selecting a setting function about the characteristics of the cable; processing the media signal on the basis of the information about the characteristics of the cable inputted through the setting menu.

According to another exemplary embodiment of the present invention, the setting menu comprises at least one of an item for inputting the length of the cable and an item for selecting sensitivity based on the characteristics of the cable.

According to another exemplary embodiment of the present invention, the processing the media signal comprises compensating for frequency loss of the media signal on the basis of the inputted information about the characteristics of the cable.

According to another exemplary embodiment of the present invention, the connector comprises at least one of an HDMI connector and a DVI connector, and the signal processor comprises a TMDS receiver.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
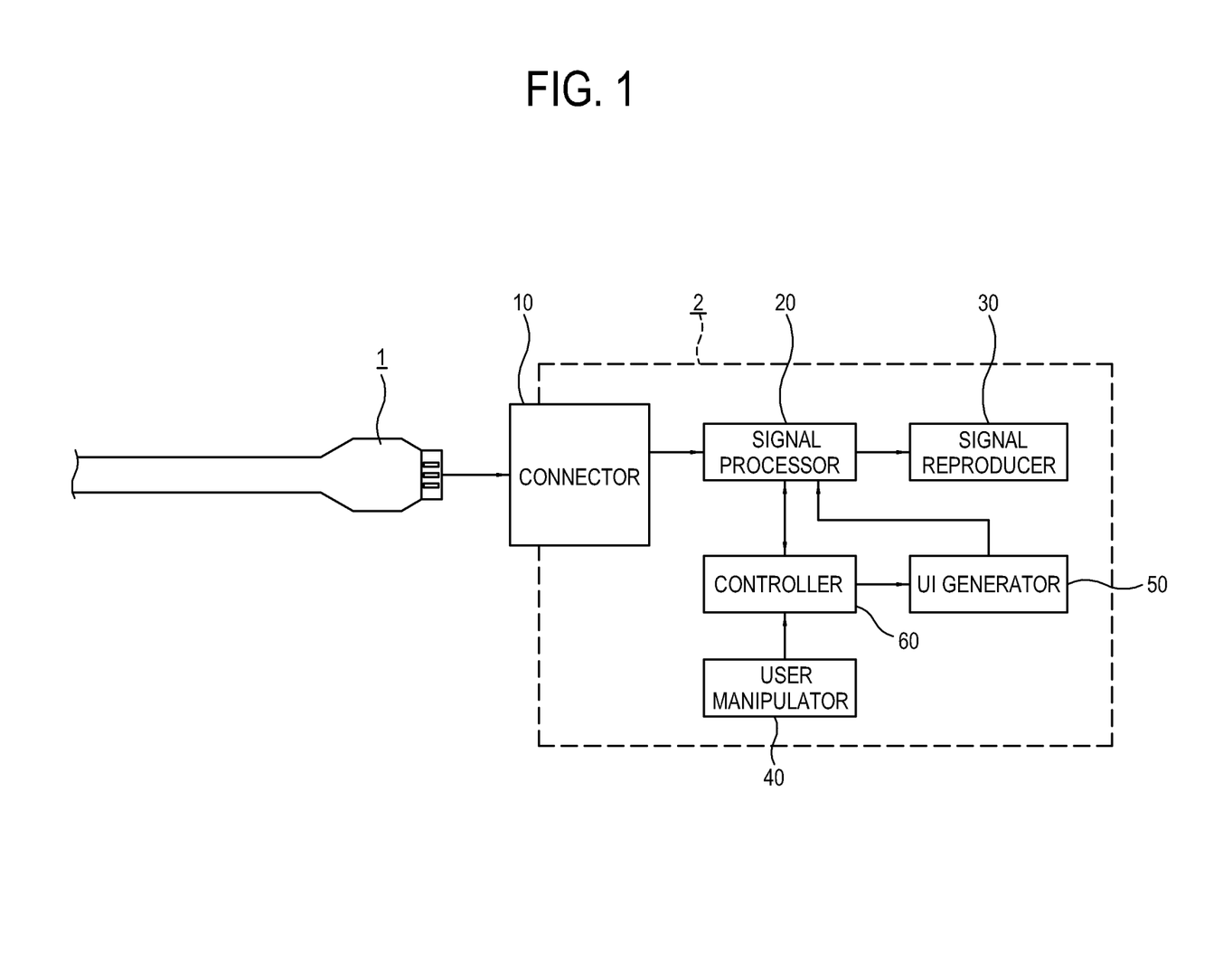
FIG. 1 is a control block diagram of a display apparatus according to an exemplary embodiment of the present invention.

FIG. 1 is a control block diagram of a display apparatus according to an exemplary embodiment of the present invention.

As shown in FIG. 1, a display apparatus 2 according to the present embodiment includes a connector 10 to which a cable 1 for transmitting a signal outputted from an external source (not shown) is connected. Display apparatus 2 further includes a signal processor 20 to process the transmitted signal and a signal reproducer 30 to reproduce a picture and/or a sound based on the processed signal. Additionally, display apparatus 2 further includes a user manipulator 40, a UI generator 50 and a controller 60.

The connector 10 is connected to the cable 1 and receives video signals corresponding to one or more various external sources. For example, the connector 10 may include input terminals for a composite video baseband signal (CVBS), an S-video signal, a component signal, a personal computer (PC) signal, a digital video/visual interactive (DVI) signal, and a high-definition multimedia interface (HDMI) signal. Of course, any other type of video, image, audio, information, data, or multimedia signal may be input to connector 10 with connector 10 including the appropriate corresponding input terminal.

The signal processor 20 includes an audio processor to process an audio signal received through the connector 10, and a video processor to process a video signal received through the connector 10. The signal reproducer 30 may include a display unit to display a picture based on the video signal, and a speaker unit to output a sound based on the audio signal. Further, the signal processor 20 includes an equalization circuit to compensate for frequency loss resulting from signal transmission.

Here, the video processor processes the received video signal to have a format suitable for the display unit. According to the present embodiment, the video processor includes various signal processing integrated chips (IC) such as a color signal separator, an analog-digital converter (ADC), a transition minimized differential signaling (TMDS) receiver, a video decoder, a de-interlacer, a scaler, or a picture-quality enhancer. Of course, the video processor may include any other type signal processing integrated chips that perform various signal processing functions.

The user manipulator 40 is provided to enable a user to select and release a function of controlling an input source and various display states. The user manipulator 40 includes a menu key (not shown) provided in a remote controller, and a key signal generator (not shown) to generate a key signal corresponding to a key manipulation. Here, the user manipulator may be implemented as a mouse, keyboard, or other type of input device. Further, the user manipulator may be provided on a main panel of the display apparatus.

The UI generator 50 generates a UI menu according to the control of the controller 60, thereby allowing a user to input and select information about the characteristics of the cable. Here, the UI generator 50 may be implemented by an on screen display (OSD) generating integrated chip (IC). The UI menu is synthesized with the video signal being processed by the video processor, and displayed on the display unit.

Here, the UI menu may include items for inputting/selecting information about the cable, such as the length of the cable or frequency gain adjustment compensation, according to the characteristics of the cable. Further, the frequency gain adjustment compensation item can include additional items, such as sensitivity of the cable. Also, the information about the cable can include various information in addition to the length thereof.

The controller 60 controls the UI generator 50 to generate the UI menu to allow a user to input information about the characteristics of the cable, and to control the signal processor 20 to process the received signal according to setting values corresponding to characteristics of the cable 1 that is input through the user manipulator 40. Here, the controller 60 can be implemented by a microcomputer, a central processing unit (CPU), or any other type of controller.

Because a transmission signal is weakened through the cable, the loss in the transmitted signal should be compensated for while it is being amplified, otherwise noise is processed. To compensate for the loss according to the characteristics of the cable, the controller 60 controls the UI generator 50 to provide the UI menu, thus allowing a user to input and/or select the information about the characteristics of the cable.

Further, the controller 60 determines signal enhancements according to the information and the setting values inputted and/or selected by a user. In addition, the controller 60 controls the equalization circuit of the signal processor 20 to apply different frequency compensations, such as the signal amplification, noise processing or other types of compensation to the received signal according to the determined signal enhancement.

Thus, when a current picture contains noise for example, the UI menu is provided for allowing a user to select the information and the setting values adapted to the characteristics of the currently used cable. Further, the frequency loss is compensated differently according to the characteristics of the cable input and/or selected by a user, so that the display apparatus can overcome a poor image reproduction condition, according to the cable.

According to an exemplary embodiment of the present invention, the display apparatus 2 includes a register for the noise process. The controller 60 determines and changes an optimal register value adapted to the equalization circuit according to the information about the characteristics of the cable inputted and/or selected by a user. Further, the signal processor 20 processes the received signal on the basis of the optimal register value, which will be described in more detail.

Below, the display apparatus 2 according to an exemplary embodiment of the present invention will be described with reference to FIGS. 2, 3A and 3B. Here, repetitive descriptions will be avoided as necessary.

Figure 2:
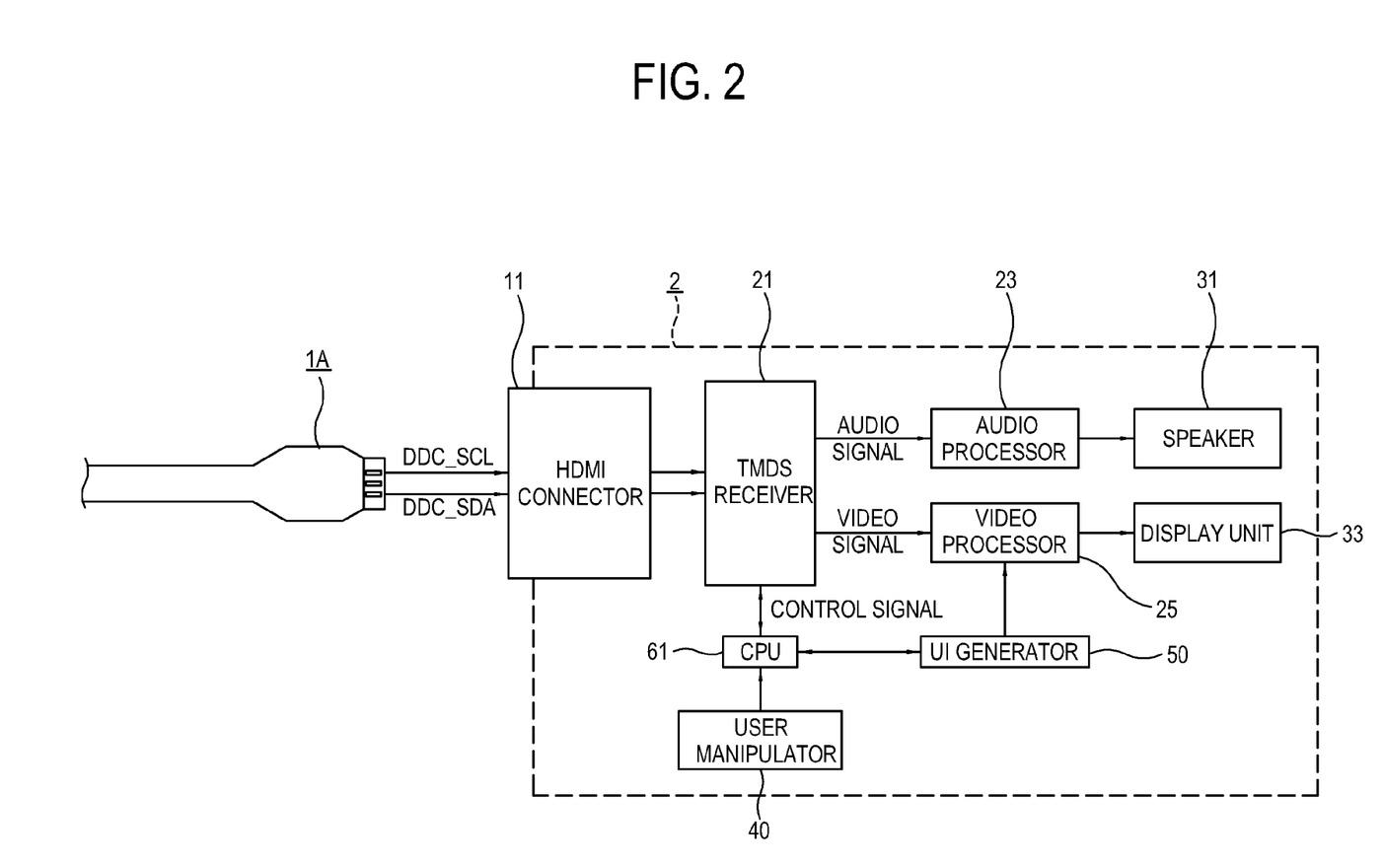
FIG. 2 is a control block diagram of a display apparatus according to an exemplary embodiment of the present invention.

FIG. 2 is a control block diagram of the display apparatus 2 according to an exemplary embodiment of the present invention.

As shown in FIG. 2, the display apparatus 2 according to an exemplary embodiment of the present invention includes an HDMI connector 11 to which an HDMI cable 1A is connected; a TMDS receiver 21 processing an HDMI signal by dividing it into a video signal, an audio signal and a control signal; a video processor 23; an audio processor 25; a user manipulator 40; a UI generator 50; and a CPU 61. Here, the video processor 23 and the audio processor 25 process the divided video and audio signals to be adapted to the output standards of a display unit 33 and a speaker 31.

A TMDS type digital signal is transmitted from an external source to the display apparatus 2 through the HDMI cable 1A. Here, the HDMI standards specify a blanking period for the transmission of appendix data, and enable the video signal, the audio signal, the control signal to be transmitted through one cable. For example, the HDMI cable 1A transmits clock and data through a DDC_SCL line and a DDC_SDA line, respectively.

The HDMI signal transmitted through the HDMI cable 1A is processed by the TMDS receiver 21. Here, the TMDS receiver 21 decodes a signal, which is converted to have a TMDS format by a TMDS transmitter (not shown) of the external source, to be divided into the video signal, the audio signal and the control signal. The TMDS receiver 21 includes a signal converting chipset (not shown). Further, the TMDS receiver 21 includes an equalization circuit to compensate for frequency loss in signal transmission. For example, a signal weakening, noise generating, or other types of signal conditions are compensated for.

In addition, the TMDS receiver 21 can include a register for compensating for the frequency loss of the input signal on the basis of a set register value.

As described above, the UI generator 50 generates a UI menu according to the control of the CPU 61 (to be described later), thereby allowing a user to input and/or select information about the characteristics of the cable, which will be described with reference to FIGS. 3A and 3B.

Figure 3A:
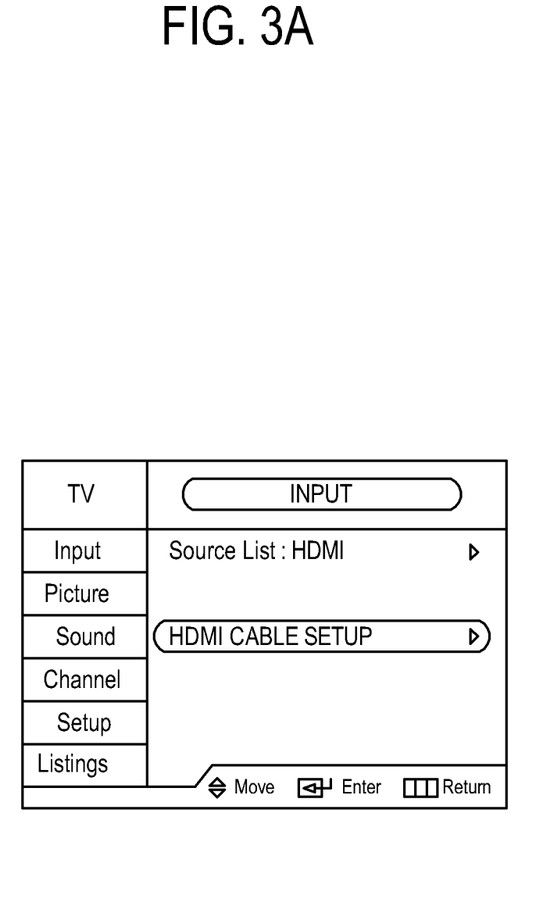
FIGS. 3A and 3B show UI screens according to an exemplary embodiment of the present invention.

When a user selects a menu related to a signal input through keys, such as up/down/left/right keys, provided in the user manipulator 40, and enters a setting menu related to the cable, the CPU 61 controls the UI generator 50 to generate the UI menu for setting information about the cable, as shown in FIG. 3A.

For example, when a user selects the HDMI cable 1A among the plurality types of cables through the user manipulator 40, a corresponding setting item is displayed. Then, a user can input and/or select the information about the characteristics of the cable by clicking the item "HDMI CABLE SETUP". Here, the item "HDMI CABLE SETUP" may include sub-items such as the length of the cable, the gain value relevant to compensating the signal loss, or any other cable characteristic.

When a user sets the information through the UI menu, the CPU 61 controls the TMDS receiver 21 to properly compensate for the loss of the received signal, such as noise, on the basis of the set information. Thus, the signals are processed differently according to the characteristics of each cable input and/or selected by a user through the UI menu, thereby sufficiently dealing with the generated noise.

At this time, the CPU 61 may include an operation program to find an optimal setting value corresponding to the information about the characteristics of the cable input and/or selected by a user. Alternatively, the CPU 61 may use a data table in finding the optimal register value.

For example, when a user inputs the cable information that the cable has a length of 7 m and more, "0xC3" can be determined as the optimal register value. When the cable has a length of 5 m and below, "0xC1" can be determined as the optimal register value. At this time, the setting value is set to more sensitively process the signal amplification and the noise compensation as the cable becomes longer. Here, the CPU 61 can be replaced by a microcomputer (not shown).

Figure 3B:
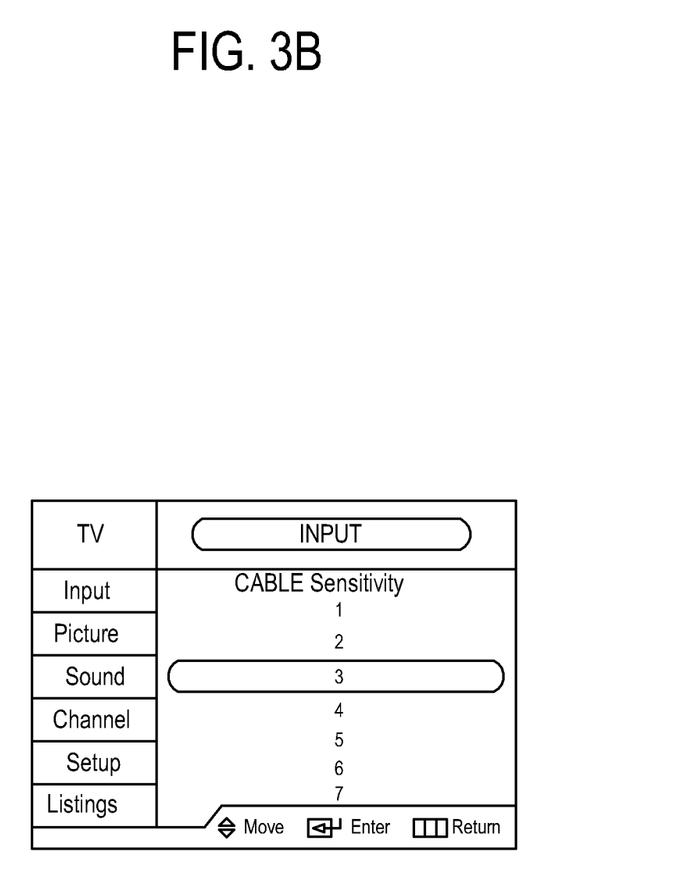

Further, as shown in FIG. 3B, the UI menu can include an item for selecting cable sensitivity. When a user feels that a current picture has noise, he/she can adjust the cable sensitivity by entering the corresponding menu. The CPU 61 controls the TMDS receiver 21 to compensate for the frequency loss depending on enhancement that is based on the setting value. Thus, a user adjusts the cable sensitivity, thereby compensating for the frequency loss differently according to the characteristics of the cable.

Figure 4:
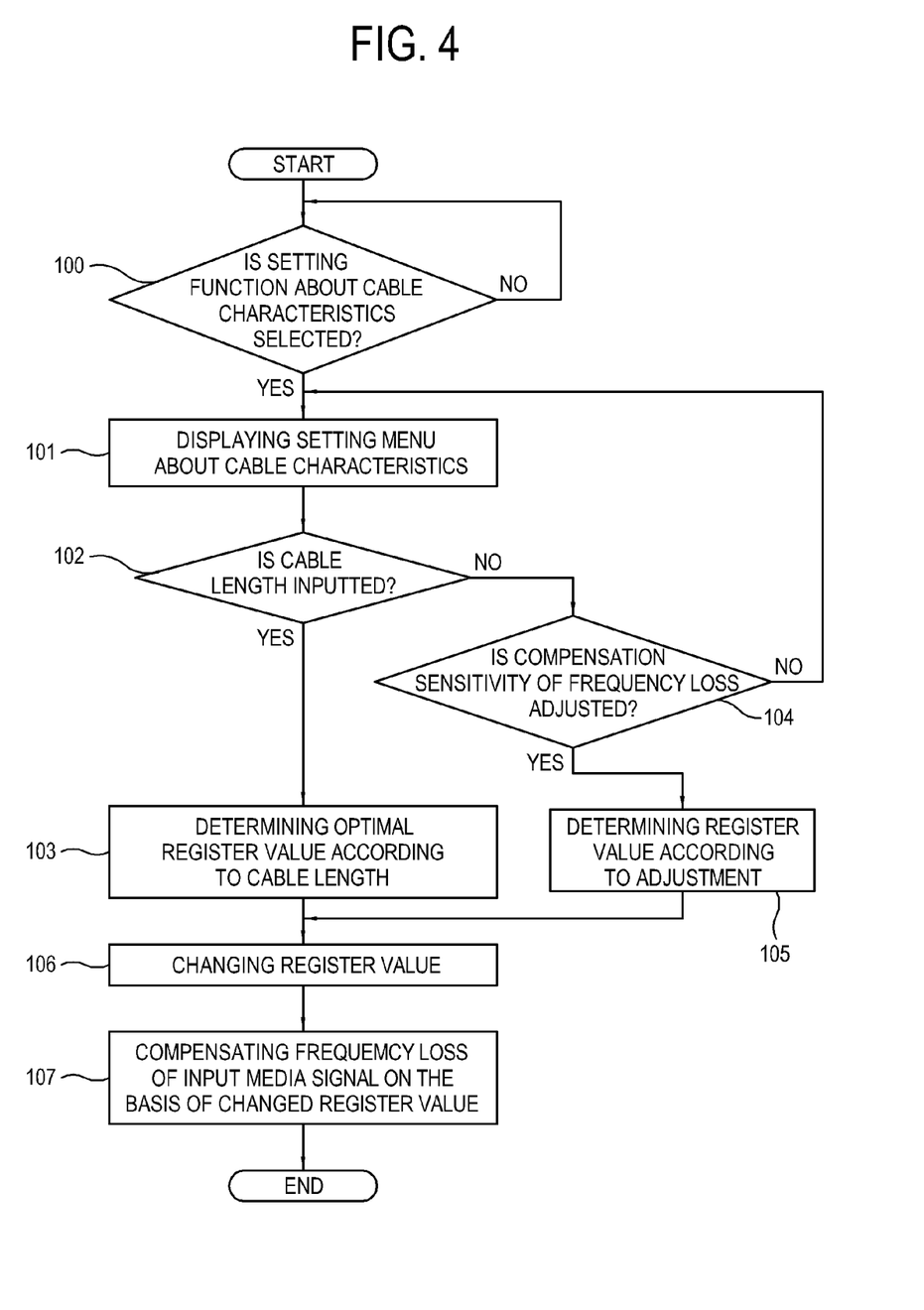
FIG. 4 is a control flowchart of the display apparatus according to an exemplary embodiment of the present invention.

Below, a control method of the display apparatus 2 according to an exemplary embodiment of the present invention will be described with reference to FIG. 4.

At operation 100, when a user selects a setting function for the characteristics of the cable through the user manipulator 40, at operation 101, the CPU 61 controls the UI generator 50 to generate the UI menu for allowing a user to set the information about the characteristics of the cable.

Here, the UI menu is synthesized with a currently processed video signal and displayed on the display unit 33, and thus a user can point to or select the item for inputting the information about the characteristics of the cable through the user manipulator 40.

At operation 102, when a user selects an item relevant to setting the length of the cable among the displayed items and inputs the information about the length of the cable, at operation 103 the CPU 61 determines an optimal register value corresponding to the input information about the length of the cable.

Meanwhile, at operation 104, when a user selects an item relevant to cable sensitivity, such as the compensation sensitivity of the frequency loss among the displayed items and selects the desired sensitivity, at operation 105, the CPU 61 determines an optimal register value corresponding to the selected sensitivity.

At operation 106, the CPU 61 changes the setting value of the register into the optimal register value determined depending on the characteristics of the cable. At operation 107, the CPU 61 controls the TMDS receiver 21 to compensate the frequency loss of a received media signal on the basis of the optimal register value.

Thus, the display apparatus 2 compensates the frequency loss of the signal according to the characteristics of the cables inputted and/or selected by a user, thereby solving problems such as the noise generation or the like.

In the present embodiment, the HDMI cable 1A is described, but not limited thereto. Alternatively, an exemplary embodiment of present invention may be applied to other interface cables such as the DVI cable and the corresponding signal reproducers.

As described above, exemplary embodiments of the present invention include a media player and a control method thereof, which can provide a UI allowing a user to input information about cable characteristics, and properly process a signal according to the cable characteristics inputted by a user.

While the invention has been shown and described with reference to certain embodiments thereof, it will be understood by those skilled in the art that various changes in form and details may be made therein without departing from the spirit and scope of the invention as defined by the appended claims.

What is claimed is:

1. A display apparatus comprising a connector to which a cable for transmitting a media signal from an external source is connected, the display apparatus comprising:
    a signal processor for processing the media signal transmitted through the cable;
    a UI generator for generating a setting menu for setting characteristics of the cable;
    a user manipulator comprising a remote controller; and
    a controller for controlling the signal processor to process the media signal on the basis of the set characteristics of the cable inputted through the setting menu by the user manipulator;
    wherein the setting of the characteristics of the cable comprises inputting information about the characteristics of the cable, and the inputting of the information comprises selecting a value of sensitivity of the cable; and
    wherein the controller controls the signal processor to compensate for frequency loss on the basis of the sensitivity value selected through the setting menu by the user manipulator.

2. The display apparatus according to claim 1, wherein the signal processor comprises an equalization circuit for compensating for frequency loss of the media signal.

3. The display apparatus according to claim 2, further comprising a register for compensating the frequency loss of the media signal,
    wherein the controller determines a register value depending on the inputted information about the characteristics of the cable, and controls the equalization circuit to process the media signal on the basis of the register value.

4. The display apparatus according to claim 3, wherein the controller comprises at least one of a CPU and a microcomputer.

5. The display apparatus according to claim 4, wherein the connector is an HDMI connector.

6. The display apparatus according to claim 5, wherein the signal processor comprises a TMDS receiver.

7. A display apparatus comprising a connector to which a cable for transmitting a media signal from an external source is connected, the display apparatus comprising:
    a signal processor for compensating for frequency loss of the media signal;
    a UI generator for generating a menu for inputting information about characteristics of the cable, the inputting of the information comprising selecting a value of sensitivity of the cable;
    a user manipulator comprising a remote controller; and
    a controller for determining a setting value used for the compensation of the frequency loss on the basis of the information about the characteristics of the cable inputted using the menu through the user manipulator, and for controlling the signal processor to process the frequency loss of the media signal on the basis of the determined setting value;
    wherein the controller controls the signal processor to compensate for frequency loss on the basis of the sensitivity value selected through the setting menu by the user manipulator.

8. The display apparatus according to claim 7, wherein the information about the characteristics of the cable includes information about the length of the cable.

9. The display apparatus according to claim 7, wherein the connector is an HDMI connector.

10. The display apparatus according to claim 9, wherein the signal processor comprises a TMDS receiver.

11. A display apparatus comprising a connector to which a cable for transmitting a media signal from an external source is connected, the display apparatus comprising:
    a signal processor for compensating for a frequency loss of the media signal;
    a UI generator for generating a menu for adjusting a gain for the compensation of the frequency loss according to characteristics of the cable;
    a user manipulator comprising a remote controller; and a controller for controlling the signal processor to compensate for the frequency loss of the media signal on the basis of the gain value selected through the menu;

wherein the menu comprises an item for selecting a value of sensitivity of the compensation for the frequency loss;

wherein the controller controls the signal processor to compensate for frequency loss on the basis of the sensitivity value selected through the setting menu by the user manipulator.

12. The display apparatus according to claim 11, wherein the connector comprises at least one of an HDMI connector and a DVI connector.

13. The display apparatus according to claim 12, wherein the signal processor comprises a TMDS receiver.

14. A method of controlling a display apparatus comprising a connector to which a cable for transmitting a media signal from an external source is connected, and a signal processor to process the media signal transmitted through the cable, the method comprising:

generating, by the display apparatus, a setting menu for inputting information about characteristics of the cable, the setting menu comprising an item for selecting a value of sensitivity of the cable; and processing, by the signal processor of the display apparatus, the media signal on the basis of the information about the characteristics of the cable inputted through the setting menu;

wherein the method further comprises controlling, by a controller, the signal processor to compensate for frequency loss on the basis of the sensitivity value selected through the setting menu; and wherein the inputting through the setting menu is performed by a remote controller of the display apparatus.

15. The method according to claim 14, wherein the processing the media signal comprises compensating for frequency loss of the media signal on the basis of the inputted information about the characteristics of the cable.

16. The method according to claim 15, wherein the connector comprises at least one of an HDMI connector and a DVI connector.

17. The method according to claim 16, wherein the signal processor comprises a TMDS receiver.

* * * * *